United States Patent
Suo

(10) Patent No.: US 12,078,161 B2
(45) Date of Patent: Sep. 3, 2024

(54) PUMP-VALVE INTEGRATED MACHINE FOR PNEUMATIC LUMBAR SUPPORT OF AUTOMOBILE SEAT

(71) Applicant: NEW DEVELOPMENT (CHANGCHUN) AUTO CONTROL SYSTEM CO., LTD., Jilin (CN)

(72) Inventor: Yongan Suo, Jiutai (CN)

(73) Assignee: NEW DEVELOPMENT (CHANGCHUN) AUTO CONTROL SYSTEM CO., LTD., Jiutai (CN)

( * ) Notice: Subject to any disclaimer, the term of this patent is extended or adjusted under 35 U.S.C. 154(b) by 364 days.

(21) Appl. No.: 17/600,496

(22) PCT Filed: Mar. 31, 2020

(86) PCT No.: PCT/CN2020/082509
§ 371 (c)(1),
(2) Date: Sep. 30, 2021

(87) PCT Pub. No.: WO2020/200208
PCT Pub. Date: Oct. 8, 2020

(65) Prior Publication Data
US 2022/0170451 A1   Jun. 2, 2022

(30) Foreign Application Priority Data

Apr. 1, 2019   (CN) .......................... 201910256177.0

(51) Int. Cl.
*F04B 39/10*   (2006.01)
*B60N 2/66*   (2006.01)
(Continued)

(52) U.S. Cl.
CPC ............. *F04B 39/10* (2013.01); *B60N 2/665* (2015.04); *F04B 49/225* (2013.01); *F04B 39/0027* (2013.01); *F04B 39/08* (2013.01)

(58) Field of Classification Search
CPC .......... F04B 43/02; F04B 39/10; F04B 45/04; F04B 39/08; B60N 2/665; B60N 2/66
See application file for complete search history.

(56) References Cited

U.S. PATENT DOCUMENTS 8,794,707 B2 *   8/2014   Bocsanyi ............... B60N 2/665
                                                            297/284.6
10,086,720 B2 *   10/2018   Dankbaar .............. B60N 2/665
(Continued)

FOREIGN PATENT DOCUMENTS

CN   105443807 A   3/2016
CN   105443832 A   3/2016
(Continued)

OTHER PUBLICATIONS

Office Action issued on Oct. 24, 2022, in corresponding Japanese Application No. 2021-560507, 10 pages.
(Continued)

*Primary Examiner* — Nathan C Zollinger
(74) *Attorney, Agent, or Firm* — Maier & Maier, PLLC

(57) ABSTRACT

A pump-valve integrated machine for a pneumatic lumbar support of an automobile seat includes: an air pump; a pump valve connection base that is provided with a one-way air outlet structure, which is opposite to and in communication with an air outlet hole of the air pump; an electromagnetic air valve lower base that is fixed onto the air pump and is provided with a mounting groove and a ventilation hole are; a normally open electromagnetic air valve that is disposed on the electromagnetic air valve lower base and has an air inlet end corresponds to the ventilation hole; an electromagnetic air valve upper cover that is provided above the normally open electromagnetic air valve and has an air outlet connector corresponds to a valve core of the normally open electromagnetic air valve; and a control circuit board.

12 Claims, 10 Drawing Sheets

(51) Int. Cl.
*F04B 39/00* (2006.01)
*F04B 39/08* (2006.01)
*F04B 49/22* (2006.01)

(56) References Cited

U.S. PATENT DOCUMENTS

| | | | | |
|---|---|---|---|---|
| 10,920,761 | B2* | 2/2021 | Yin | B60N 2/914 |
| 11,375,823 | B2* | 7/2022 | Chang | F16K 31/02 |
| 2014/0232155 | A1* | 8/2014 | Bocsanyi | B60N 2/914 |
| | | | | 297/284.6 |
| 2020/0100599 | A1* | 4/2020 | Chang | A47C 7/467 |
| 2022/0055513 | A1* | 2/2022 | Zhang | F16K 11/24 |

FOREIGN PATENT DOCUMENTS

| | | |
|---|---|---|
| CN | 107512207 A | 12/2017 |
| CN | 207670135 U | 7/2018 |
| CN | 108361419 A | 8/2018 |
| CN | 207809133 U | 9/2018 |
| CN | 207814535 U | 9/2018 |
| CN | 208010548 U | 10/2018 |
| CN | 109318770 A | 2/2019 |
| CN | 208534727 U | 2/2019 |
| CN | 110030175 A | 7/2019 |
| CN | 210068424 U | 2/2020 |
| JP | 2002364533 A | 12/2002 |
| JP | 2018535764 A | 12/2018 |

OTHER PUBLICATIONS

Office Action issued on Sep. 18, 2023, in corresponding Chinese Application No. 201910256177.0, 10 pages.
International Search Report issued on Jun. 22, 2020 in corresponding International application No. PCT/CN2020/082509; 5 pages.
Extended European Search Report issued on Feb. 21, 2022, in connection with corresponding European Application No. 20784995. 1; 8 pages.

* cited by examiner

PUMP-VALVE INTEGRATED MACHINE FOR PNEUMATIC LUMBAR SUPPORT OF AUTOMOBILE SEAT

CROSS-REFERENCE TO RELATED APPLICATIONS

This application is a National Stage of International Application No. PCT/CN2020/082509, filed on Mar. 31, 2020, which claims priority to the Chinese invention patent application No. 201910256177.0 and entitled "Pump-valve integrated machine for pneumatic lumbar support of automobile seat", filed in the China National Intellectual Property Administration on Apr. 1, 2019, the entire contents of the above applications are incorporated herein by reference.

TECHNICAL FIELD

The present application belongs to the field of air pumps for a pneumatic lumbar support, and specifically relates to a pump-valve integrated machine for a pneumatic lumbar support of an automobile seat that integrates an air pump and an air valve.

BACKGROUND

In recent years, with the strongly development of the country's automobile industry, China has become the third country after the United States and Japan with an annual output of more than 10 million vehicles, and has entered the ranks of 10 million vehicles. Moreover, with the increase of personal family income, automobiles are no longer just office and transportation tools for government agencies and enterprises. Automobiles have become the first choice for household consumption. In addition to higher requirements for automobile brand, safety and quality, people pay more attention to the comfort of driving, among which the comfort of the automobile seat is very important.

In order to reduce the fatigue caused by long-term driving, a lumbar support is usually disposed on the automobile seat. At present, there are three types of lumbar supports disposed on the automobile seat on the market, namely a manual lumbar support, an electric lumbar support and a pneumatic lumbar support, respectively. However, the manual lumbar support needs to be operated manually, and large operating torque, which often causes users to feel inconvenient and laborious: the electric lumbar support has a complex structure, many parts, high costs, and poor reliability: therefore, the pneumatic lumbar support is an ideal choice in the entire market.

The air pump and air valve used in the pneumatic lumbar support are the core components of the entire pneumatic lumbar support. For most of the existing pneumatic lumbar supports in the market, the air pump and the air valve are separated, namely, a separate air valve and a separate air pump are connected with each other by a gas circuit such as a pipeline. However, the separation of pump and valve has the following disadvantages: (1) two parts require more transportation, storage, and management costs than one part: (2) the pump and the valve need to be connected by a gas pipe before, which occupies large space and causes cost waste in assembly, tooling, and personnel: and (3) the coordination of multiple parts is also less reliable than a single part, and the gas pipeline is prone to defects such as gas leakage and falling off.

The Chinese patent CN 208010548 U discloses a "pump-valve integrated miniature air pump with a normally open electromagnetic air valve", and in the air pump, the air pump upper cover is designed into a cylindrical cavity, which is matched and connected with the two-position two-way normally open electromagnetic air valve, so that the upper cover of the pump forms such a structure that the top and bottom thereof are connected respectively with the two-position two-way normally open electromagnetic air valve and the air pump, achieving the pump-valve integrated structure, reducing the gas pipeline and reducing the occurrence of undesirable phenomena such as gas leakage. However, the structure has too single performance and few functions, and it is impossible to simultaneously inflate and deflate multiple products when using the air pump.

SUMMARY

An object of this application is to provide a pump-valve integrated machine for a pneumatic lumbar support of an automobile seat with reasonable structure, good performance, high reliability and low cost, so as to solve the technical problems of the existing pump-valve integrated machine that has a single performance and cannot achieve to simultaneously inflate and deflate multiple air bags.

In order to achieve the above-mentioned object, the present application is achieved by adopting the following technical solutions:

a pump-valve integrated machine for a pneumatic lumbar support of an automobile seat including: an air pump, a pump valve connection base, an electromagnetic air valve lower base, a normally open electromagnetic air valve, an electromagnetic air valve upper cover, and a control circuit board, where a one-way air outlet structure is situated upon the pump valve connection base, and the one-way air outlet structure on the pump valve connection base is opposite to and in communication with an air outlet hole of the air pump: the electromagnetic air valve lower base is fixed onto the air pump, and a mounting groove is situated upon a bottom of the electromagnetic air valve lower base, and the pump valve connection base is provided within the mounting groove, a ventilation hole is situated upon the electromagnetic air valve lower base opposite to the one-way air outlet structure of the pump valve connection base: the normally open electromagnetic air valve is disposed on the electromagnetic air valve lower base, an air inlet end of the normally open electromagnetic air valve corresponds to the ventilation hole of the electromagnetic air valve lower base; the electromagnetic air valve upper cover is provided above the normally open electromagnetic air valve, and an air outlet connector of the electromagnetic air valve upper cover corresponds to a valve core of the normally open electromagnetic air valve, the normally open electromagnetic air valve is open when it is not powered on, and gas of the air pump is discharged from the air outlet connector through the normally open electromagnetic air valve, and when the normally open electromagnetic air valve is powered on, the gas of the air pump cannot be discharged from the air outlet connector through the normally open electromagnetic air valve; and the control circuit board is configured to control operations of the electromagnetic air valve and the air pump.

As a preferred embodiment of the present application, the pump-valve integrated machine further includes a housing disposed on the air pump, and the electromagnetic air valve lower base, the normally open electromagnetic air valve, and the electromagnetic air valve upper cover are all disposed in the housing.

As a preferred embodiment of the present application, the pump-valve integrated machine further includes a pressure sensor, and a mounting hole for the pressure sensor is situated upon a side wall of the electromagnetic air valve lower base. The mounting hole for the pressure sensor communicates with the ventilation hole, and a connection pipe is disposed outside the mounting hole for the pressure sensor, and the connection pipe is connected with the pressure sensor, to transmit a pressure signal to the pressure sensor. The pressure sensor and the control circuit board are electrically connected.

As a further preferred embodiment of the present application, the pump valve connection base includes a rubber sheet bracket and a one-way rubber sheet. A connection protrusion is situated upon a bottom of the rubber sheet bracket, and the connection protrusion is disposed on the air outlet hole of the air pump. A mounting groove is situated around the connection protrusion, and the mounting groove is provided with a sealing ring therein. The mounting hole for the one-way rubber sheet is situated above the rubber sheet bracket, and an air vent hole is situated around the mounting hole for the one-way rubber sheet. The one-way rubber sheet is disposed in the mounting hole for the one-way rubber sheet and covers the air vent hole. A mounting groove is situated around the one-way rubber sheet, and a sealing ring is disposed in the mounting groove.

As a further preferred embodiment of the present application, a mounting groove is situated upon the electromagnetic air valve lower base and around the ventilation hole, and a sealing ring is disposed in the mounting groove, and is configured to achieve sealing between the electromagnetic air valve lower base and the normally open electromagnetic air valve.

As a further preferred embodiment of the present application, the normally open electromagnetic air valve includes an outer frame, a wire rack, a valve core, a rubber plug, and a spring, where axial air inlet groove is situated upon the bottom of the outer frame, the axial air inlet groove corresponds to the ventilation hole of the electromagnetic air valve lower base: the wire rack is disposed on the outer frame, and a varnished wire is wound outside the wire rack: the valve core is sleeved in the wire rack, and upper and lower ends of the valve core are each provided with a groove, and the two grooves are each provided with the rubber plug: the spring is sleeved on an outer side surface of a butting section of the valve core and the outer frame, and the valve core and the wire rack are in clearance fit to form a ventilation passage: an air inlet end of the ventilation passage is communicated with the axial air inlet groove, and when the valve core is under the action of the spring, the rubber plug is directly above the axial air inlet groove, and when the electromagnetic air valve is powered on, the rubber plug can form sealing with the axial air inlet groove under the action of electromagnetic force.

As a further preferred embodiment of the present application, an air outlet passage is disposed in the electromagnetic air valve upper cover, and an air outlet hole of the air outlet passage is disposed on a side wall of the electromagnetic air valve upper cover, and an air vent hole is situated upon the air outlet passage at a position corresponding to the rubber plug on an upper end of the valve core, an air inlet passage is disposed on a side wall of the air vent hole, and the air inlet passage is communicated with the air vent hole, the air outlet connector and the normally open electromagnetic air valve: and in a normal case, a seal forms between the rubber plug on the upper end of the valve core and the air vent hole on the air outlet passage, and an air bag is inflated by the gas from the normally open electromagnetic air valve through the air inlet passage and the air outlet connector: when the electromagnetic air valve is powered on, the air pump stops inflating, and air in the air bag is discharged through the air outlet connector, the air inlet passage, the air vent hole, and the air outlet passage.

As a yet further preferred embodiment of the present application, a placement groove is situated in the electromagnetic air valve upper cover at a position corresponding to the wire rack, and one end of the wire rack is inserted into the placement groove: and a mounting groove is situated around the placement groove, and is provided with a sealing ring in the mounting groove.

As a still further preferred embodiment of the present application, a noise-reduction cotton is pasted on the outer side of the air outlet of the air outlet passage.

The advantages and positive effects of the present application are:

(1) The pump-valve integrated machine provided by the present application has a simple structure and is convenient to use, and the pump-valve integrated machine can be provided with multiple air outlet connectors as required, and each air outlet connector can be connected to the air bag separately, and when the air pump is started, the air discharge condition of each air outlet connector can be controlled separately by controlling the switch of the normally open electromagnetic valve, completing the process of inflating or deflating different air bags, and effectively solving the technical problem that the existing pump-valve integrated machine has single performance and cannot achieve simultaneous inflation and deflation of multiple air bags.

(2) The pump-valve integrated machine provided by the present application is fully functional, and may adjust the height of the air bag by additionally disposing the pressure sensor, and meanwhile can be prevented the air bag from being inflated to explode.

(3) The pump-valve integrated machine provided by the present application can reduce noise and improve ride comfort by additionally disposing the noise-reduction cotton at the outlet of the air outlet passage.

DETAILED DESCRIPTION OF THE EMBODIMENTS

Figure 1:
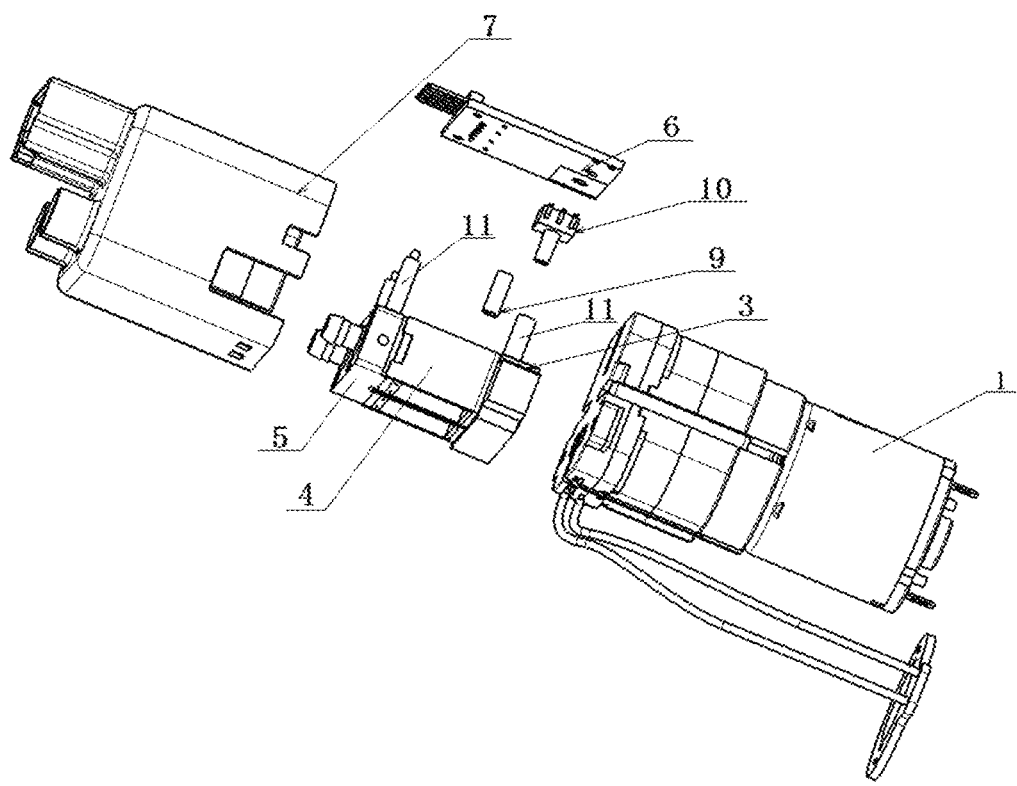
FIG. 1 is an exploded view of a pump-valve integrated machine of the present application.
Figure 2:
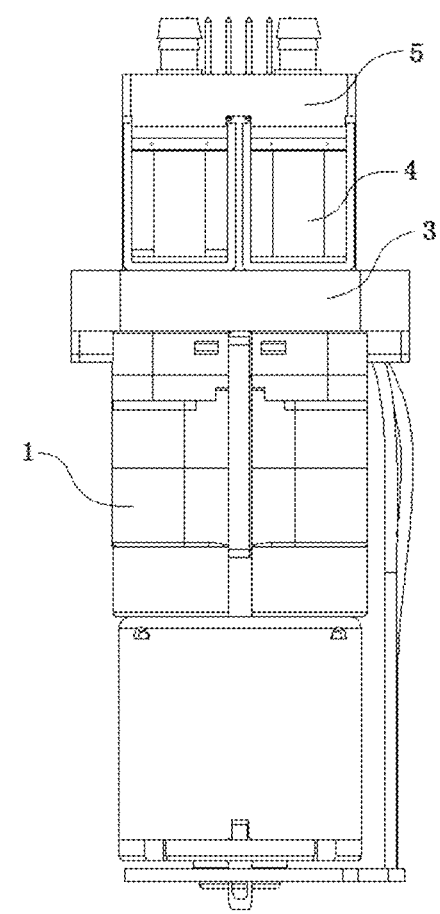
FIG. 2 is a front view of a pump-valve integrated machine without a housing.
Figure 3:
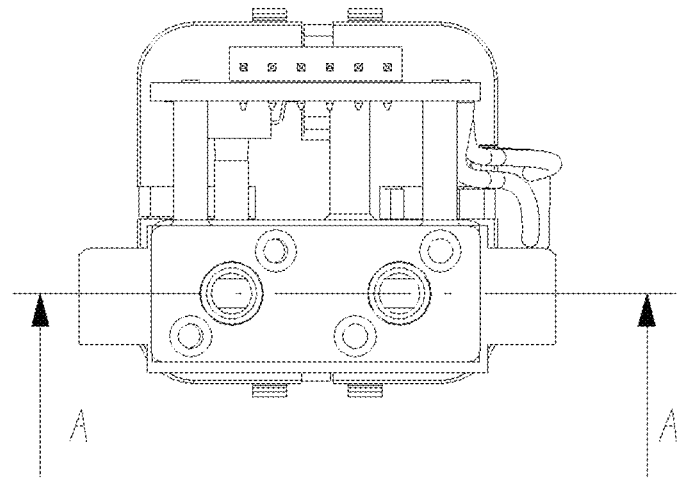
FIG. 3 is a top view of a pump-valve integrated machine without a housing.
Figure 4:
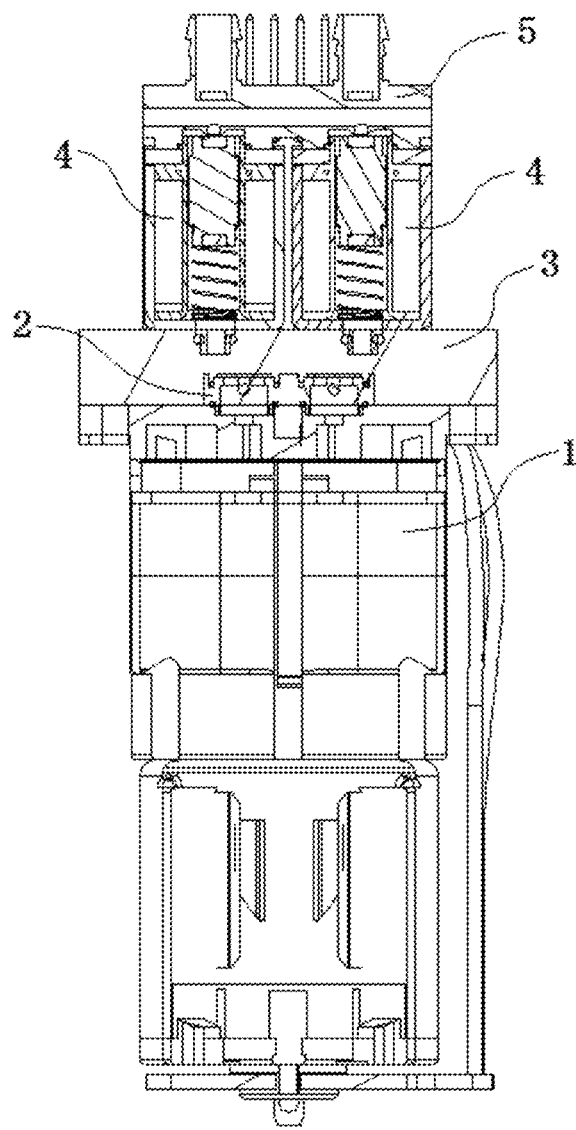
FIG. 4 is a cross-sectional view taken along A-A in FIG. 3.

In order to make the purpose, technical solutions and advantages of the embodiments of the present application clearer, the technical solutions in the embodiments of the present application will be described clearly and completely in conjunction with the accompanying drawings in the embodiments of the present application. Obviously, the described embodiments are only a part of the embodiments of the present application, but not all of the embodiments.

Referring to FIGS. 1 to 4, the pump-valve integrated machine for a pneumatic lumbar support of an automobile seat provided by the present application includes: an air pump 1, a pump valve connection base 2, an electromagnetic air valve lower base 3, a normally open electromagnetic air valve 4, an electromagnetic air valve upper cover 5, a control circuit board 6, and a housing 7, where the air pump 1 is of the model of JQF1418136, with the manufacturer: Shenzhen Jichuangxing Technology Co., Ltd. The air pump 1 may be chosen to have one air outlet hole, two air outlet holes, three or more air outlet holes according to actual needs. The air pump with two air outlet holes is selected in this embodiment. A one-way air outlet structure is situated upon the pump valve connection base 2, and the one-way air outlet structure of the pump valve connection base 2 is opposite to and in communication with the air outlet hole of the air pump 1. The electromagnetic air valve lower base 3 is fixed onto the air pump 1 by a bolt. The normally open electromagnetic air valve 4 is disposed on the electromagnetic air valve lower base 3. The electromagnetic air valve upper cover 5 is disposed above the normally open electromagnetic air valve 4. The air outlet connector of the electromagnetic air valve upper cover 5 corresponds to the valve core of the normally open electromagnetic air valve 4. The normally open electromagnetic air valve 4 is open when power is off. The gas of the air pump 1 is discharged from the air outlet connector of the electromagnetic air valve upper cover 5 through the normally open electromagnetic air valve 4. When the normally open electromagnetic air valve 4 is powered on, the gas of the air pump 1 cannot be discharged from the air outlet connector of the electromagnetic air valve upper cover 5 through the normally open electromagnetic air valve 4. The control circuit board 6 is used to control the operation of the normally open electromagnetic air valve 4 and the air pump 1.

Figure 5:
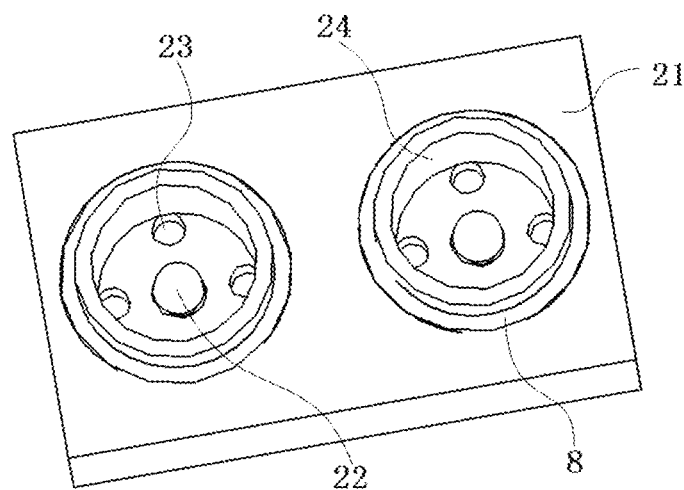
FIG. 5 is a diagram of an overall structure of a pump valve connection base of the present application.
Figure 6:
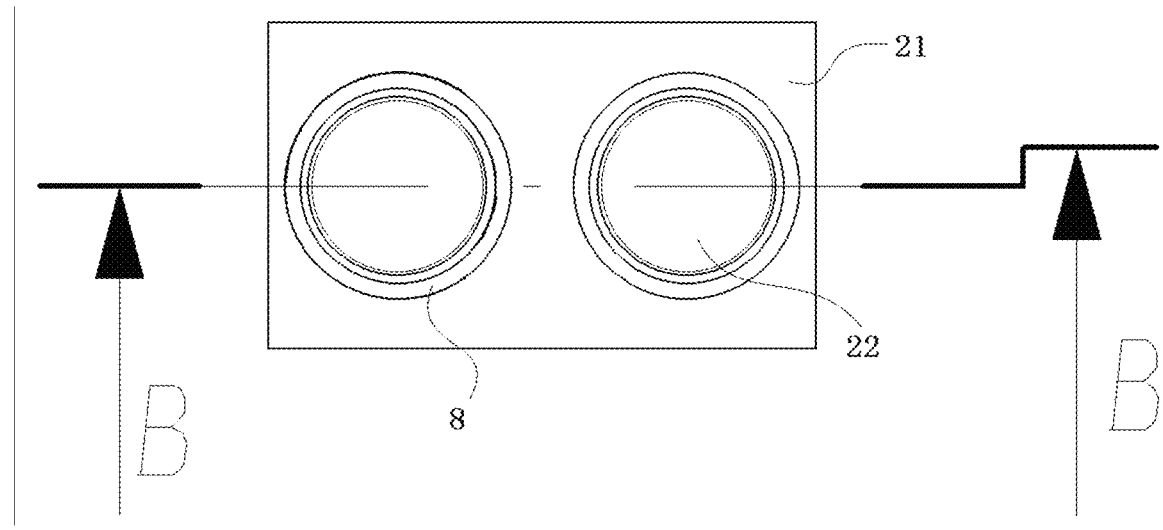
FIG. 6 is a top view of a pump valve connection base of the present application.
Figure 7:
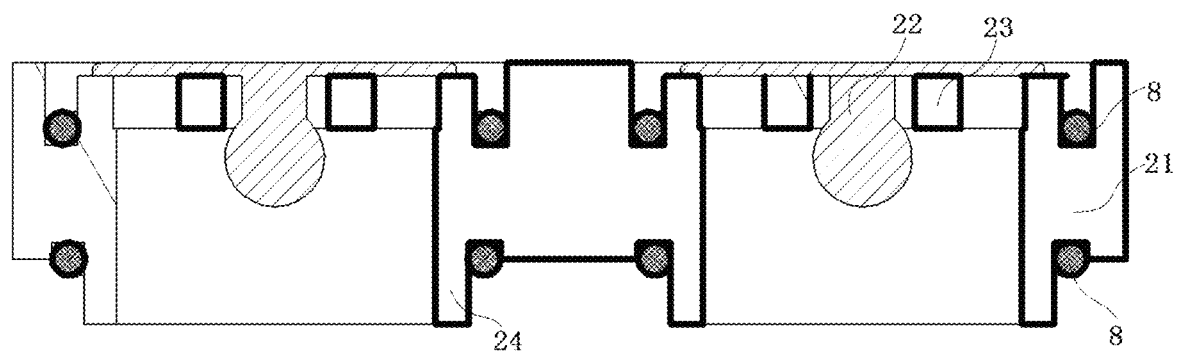
FIG. 7 is a cross-sectional view taken along B-B of a pump valve connection base of the present application.

Referring to FIGS. 5 to 7, the pump valve connection base 2 includes a rubber sheet bracket 21 and a one-way rubber sheet 22. A connection protrusion 24 is situated upon the bottom of the rubber sheet bracket 21, and the connection protrusion 24 is disposed on the air outlet hole of the air pump 1. A mounting groove is situated around the connection protrusion 24, and the mounting groove is provided with a sealing ring 8 therein. The mounting hole for the one-way rubber sheet is situated above the rubber sheet bracket 21, and an air vent hole 23 is situated around the mounting hole for the one-way rubber sheet. The one-way rubber sheet 22 is disposed in the mounting hole for the one-way rubber sheet and covers the air vent hole 23. A mounting groove is situated around the one-way rubber sheet 22, and the sealing ring 8 is disposed in the mounting groove.

Figure 8:
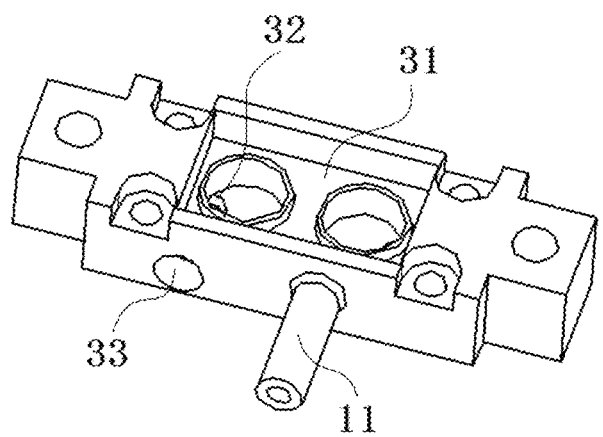
FIG. 8 is a first diagram of an overall structure of an electromagnetic air valve lower base of the present application.
Figure 9:
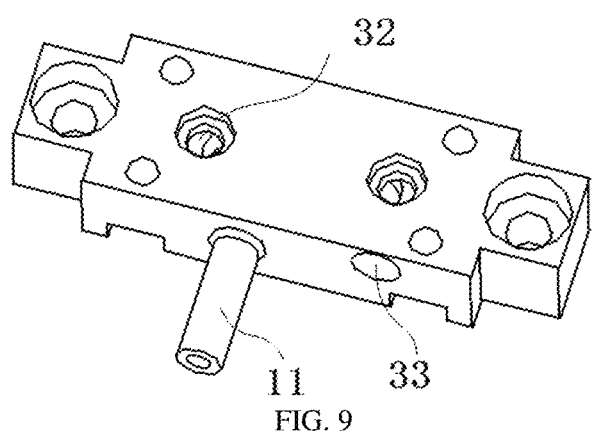
FIG. 9 is a second diagram of an overall structure of an electromagnetic air valve lower base of the present application.

Referring to FIGS. 8 to 9, a mounting groove 31 is situated upon bottom of the electromagnetic air valve lower base 3, and the mounting groove 31 is provided with the pump valve connection base 2. A ventilation hole 32 is situated upon the electromagnetic air valve lower base 3 at a position opposite to the one-way air outlet structure of the pump valve connection base 2, a mounting groove is situated upon the electromagnetic air valve lower base 3 and around the ventilation hole 32, and a sealing ring is disposed in the mounting groove, and is used to achieve sealing between the electromagnetic air valve lower base 3 and the normally open electromagnetic air valve 4.

Figure 10:
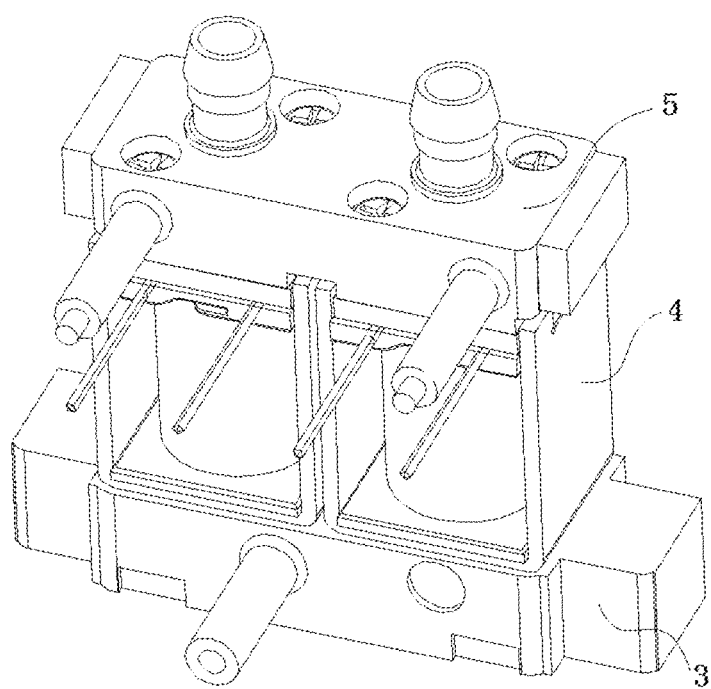
FIG. 10 is a diagram of a connection of a normally open electromagnetic air valve with an electromagnetic air valve lower base and an electromagnetic air valve upper cover.
Figure 11:
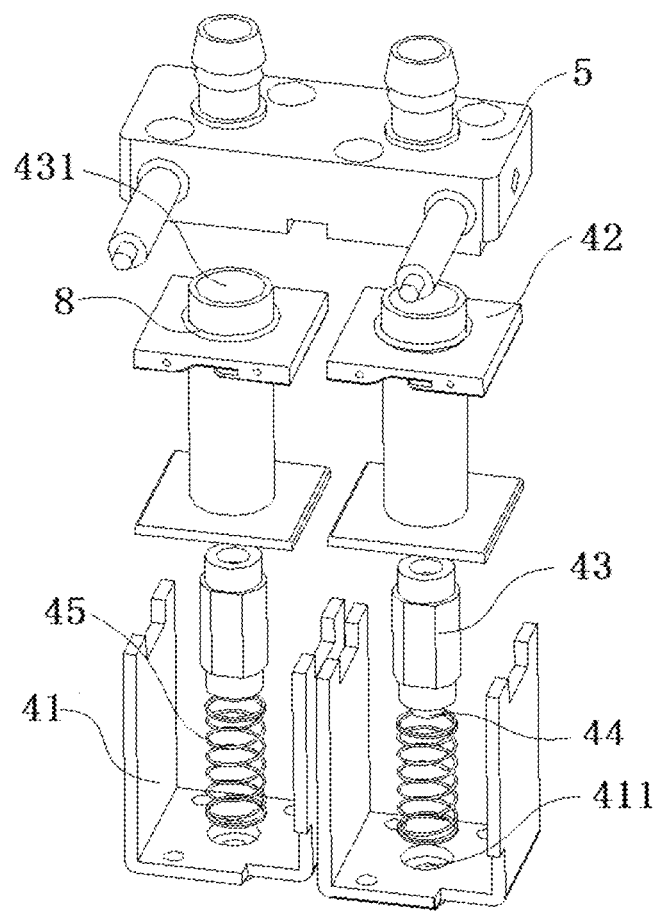
FIG. 11 is an exploded view of FIG. 10.
Figure 12:
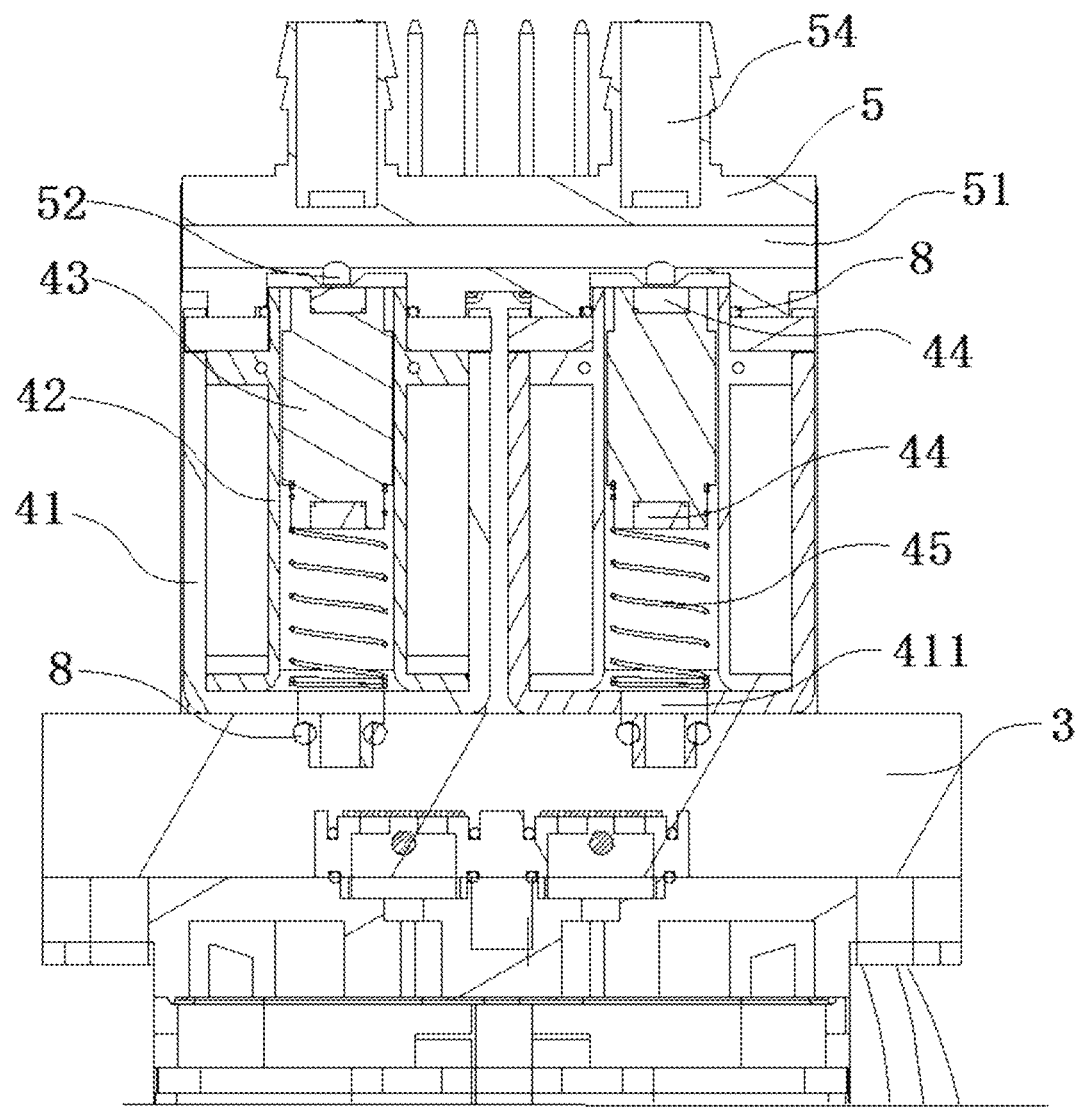
FIG. 12 is a partial enlarged view of FIG. 3.

Referring to FIGS. 10 to 12, the normally open electromagnetic air valve 4 includes an outer frame 41, a wire rack 42, a valve core 43, a rubber plug 44, and a spring 45, where an axial air inlet groove 411 is situated upon the bottom of the outer frame, the axial air inlet groove corresponds to the ventilation hole 32 of the electromagnetic air valve lower base 3: the wire rack 42 is disposed on the outer frame 41, and a varnished wire is wound outside the wire rack 42: the valve core 43 is sleeved in the wire rack 42, and grooves 431 are provided at the upper and lower ends of the valve core 43, and the rubber plugs 44 are disposed in the two grooves 341: the spring 45 is sleeved at the outer side of the butting section of the valve core 43 and the outer frame 41, and the valve core 43 and the wire rack 42 are in clearance fit to form a ventilation passage: the air inlet end of the ventilation passage is communicated with the axial air inlet groove 411, and when the valve core 43 is under the action of the spring 45, the rubber plug 44 is disposed directly above the axial air inlet groove 411. When the normally open electromagnetic air valve 4 is powered on, the rubber plug 44 can form sealing with the axial air inlet groove 411 under the action of an electromagnetic force, preventing the air pump 1 from inflating.

Figure 13:
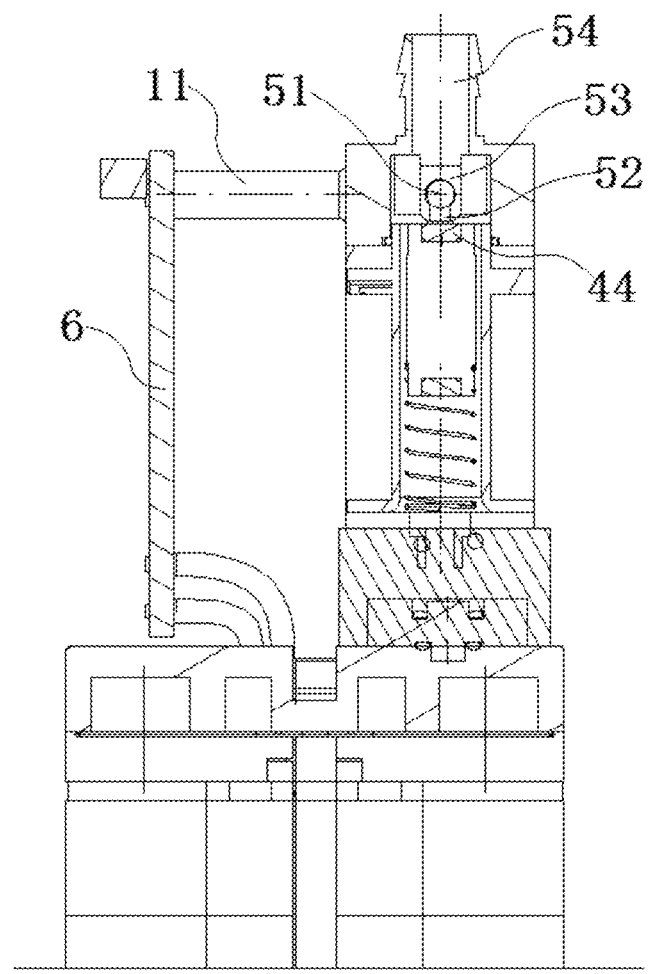
FIG. 13 is a cross-sectional view of the connection between a normally open electromagnetic air valve and an electromagnetic air valve upper cover from another angle.

Referring to FIGS. 12 to 13, an air outlet passage 51 is disposed in the electromagnetic air valve upper cover 5, and the air outlet hole of the air outlet passage 51 is disposed on the side wall of the electromagnetic air valve upper cover. A noise-reduction cotton is pasted on the outer side of the air outlet hole of the air outlet passage, and is used to reduce the noise. An air vent hole 52 is situated upon the air outlet passage 51 at a position corresponding to the rubber plug 44 on the upper end of the valve core 43, and an air inlet passage 53 is disposed on the side wall of the air vent hole 52, and the air inlet passage 53 is communicated with the air vent hole 52, the air outlet connector 54 and the normally open electromagnetic air valve 4. In a normal case, a seal forms between the rubber plug 44 on the upper end of the valve core 43 and the air vent hole 52 on the air outlet passage 51, and the air bag is inflated by the gas from the normally open electromagnetic air valve 4 through the air inlet passage 53 and the air outlet connector 54. When the normally open electromagnetic air valve 4 is powered on, the air pump 1 stops inflating, and the air in the air bag 1 is discharged through the air outlet connector 54, the air inlet passage 53, the air vent hole 52, and the air outlet passage 51.

The air outlet hole on the air pump 1 of the present application are respectively connected to the normally open electromagnetic air valves 4, and each normally open electromagnetic air valve 4 can individually control the inflation of different air outlet holes, which can achieve inflating of multiple air bags simultaneously, or selectively inflate several air bags of the multiple air bags, which is more fully functional and more convenient to use.

Figure 14:
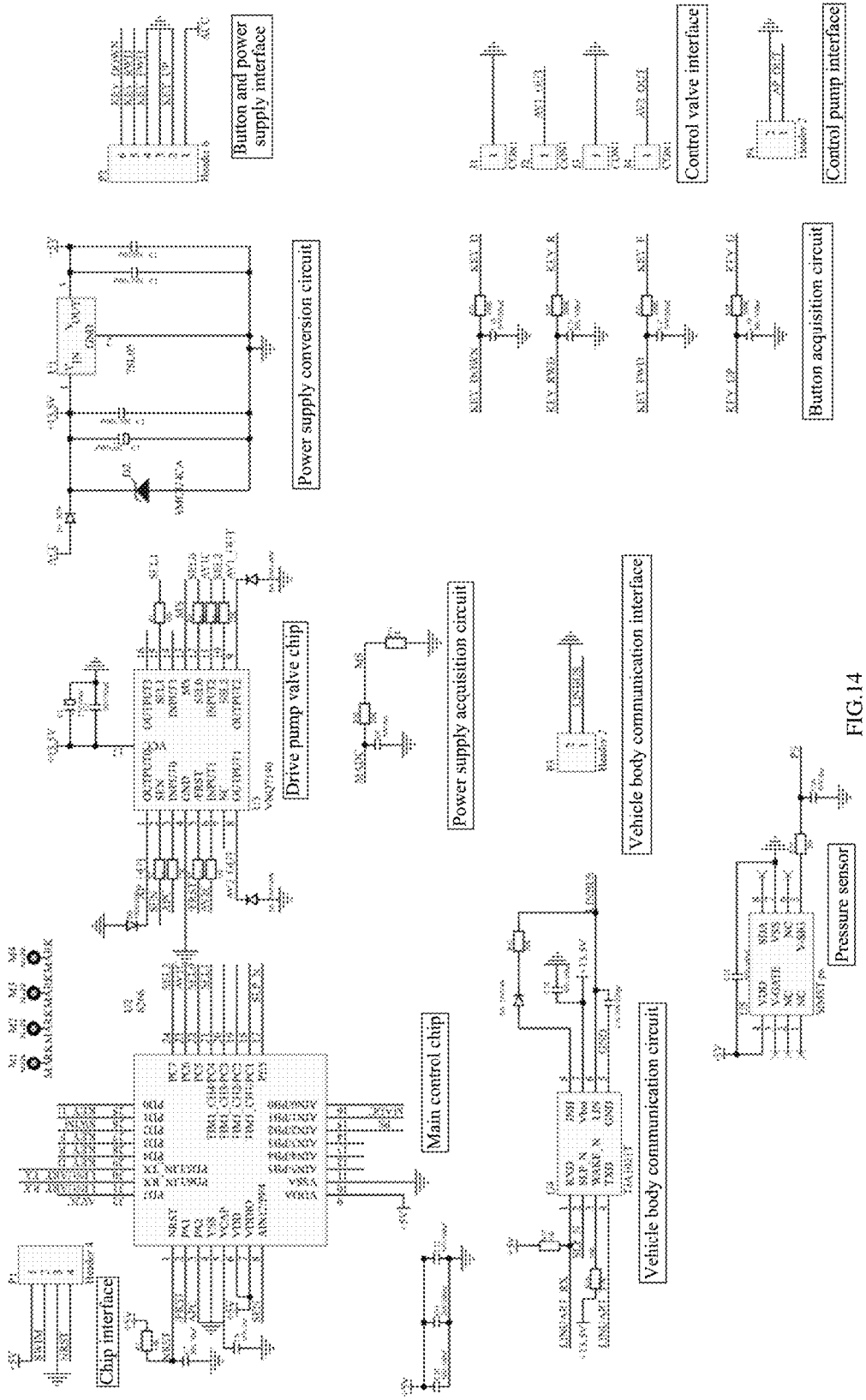
FIG. 14 is a schematic diagram of a control circuit board.

Continuing to refer to FIG. 1, FIG. 8, FIG. 9, in order to detect the inflation of each air bag by the air pump 1 at all times, a mounting hole 33 for a pressure sensor is situated upon the side wall of the electromagnetic air valve lower base 3. The mounting hole 33 for the pressure sensor communicates with the ventilation hole 32, a connection pipe 9 is disposed outside the mounting hole 33 for the pressure sensor, and the connection pipe 9 is connected with the pressure sensor 10, and is used to transmit a pressure signal to the pressure sensor 10. The pressure sensor 10 and a main control chip on the control circuit board 6 are electrically connected. The main control chip 6 is electrically connected with a drive pump valve chip, and the drive pump valve chip is electrically connected with a control pump interface and a control valve interface, and connected with the air pump 1 and the normally open electromagnetic air valve 4 by the control pump interface and the control valve interface (FIG. 14). When the main control chip detects that the pressure signal exceeds a preset value, the main control chip controls the drive pump valve chip so as to electrify the normally open electromagnetic air valve 4 and stop inflating the air bag to effectively protect the air bag and prevent the air bag from being inflating to explode. In addition, by setting the pressure value monitored by the main control chip, the height of the air bag can also be adjusted.

Further, in order to make the structure installation of pump-valve integrated machine more compact, the control circuit board 6 is disposed on the air pump and on one side of the normally open electromagnetic air valve 4 (see FIG. 1, FIG. 13), the air pump 1 is electrically connected with the normally open electromagnetic air valve 4 and the control circuit board 6, and the pressure sensor 10 is disposed on the control circuit board 6 and is disposed between the control circuit board 6 and the electromagnetic air valve lower base 3.

Further, in order to prevent the control circuit board 6 from being damaged during use, the electromagnetic air valve upper cover 5 and the electromagnetic air valve lower base 3 are each provided with a support column 11 at a side in contact with the control circuit board 6, to install and support the control circuit board 6.

Further, in order to connect the pump-valve integrated machine with the vehicle body, the pump-valve integrated machine is controlled by the control system in the vehicle body, so as to achieve the adjustment of the height of the pneumatic lumbar support. The control circuit board 6 is also provided with a button and power supply interface, and a vehicle body communication circuit electrically connected to the main control chip. The button and the power supply interface are connected with a button acquisition circuit and a power supply conversion circuit, and the button acquisition circuit is electrically connected with the main control chip, and the preset pressure valve of the main control chip is adjusted through a button on the vehicle body, achieving the functions such as parameter setting. The power supply conversion circuit is electrically connected with the main control chip through the chip interface (see FIG. 14).

The invention claimed is:

1. A pump-valve integrated machine for a pneumatic lumbar support of an automobile seat, comprising: an air pump, a pump valve connection base, an electromagnetic air valve lower base, a normally open electromagnetic air valve, an electromagnetic air valve upper cover, and a control circuit board, wherein a one-way air outlet structure is situated upon the pump valve connection base, and the one-way air outlet structure on the pump valve connection base is opposite to and in communication with an air outlet hole of the air pump; the electromagnetic air valve lower base is fixed onto the air pump, and a mounting groove is situated upon a bottom of the electromagnetic air valve lower base, and is provided with the pump valve connection base, a ventilation hole is situated upon the electromagnetic air valve lower base opposite to the one-way air outlet structure of the pump valve connection base; the normally open electromagnetic air valve is disposed on the electromagnetic air valve lower base, an air inlet end of the normally open electromagnetic air valve corresponds to the ventilation hole of the electromagnetic air valve lower base; the electromagnetic air valve upper cover is provided above the normally open electromagnetic air valve, and an air outlet connector of the electromagnetic air valve upper cover corresponds to a valve core of the normally open electromagnetic air valve, the normally open electromagnetic air valve is open when it is not powered on, and gas of the air pump is discharged from the air outlet connector through the normally open electromagnetic air valve, and when the normally open electromagnetic air valve is powered on, the gas of the air pump cannot be discharged from the air outlet connector through the normally open electromagnetic air valve; and the control circuit board is configured to control the normally open electromagnetic air valve and the air pump to operate;

wherein the pump valve connection base comprises a rubber sheet bracket and a one-way rubber sheet; a connection protrusion is situated upon a bottom of the rubber sheet bracket, and the connection protrusion is disposed on the air outlet hole of the air pump; a mounting groove is situated around the connection protrusion, and is provided with a sealing ring in the mounting groove; a mounting hole for the one-way rubber sheet is situated above the rubber sheet bracket, and an air vent hole is situated around the mounting hole for the one-way rubber sheet; the one-way rubber sheet is disposed in the mounting hole for the one-way rubber sheet and covers the air vent hole; and a mounting groove is situated around the one-way rubber sheet, and provided with a sealing ring in the mounting groove situated around the one-way rubber sheet.

2. The pump-valve integrated machine for the pneumatic lumbar support of the automobile seat according to claim 1, wherein the pump-valve integrated machine further comprises a housing, the housing is disposed on the air pump, and the electromagnetic air valve lower base, the normally open electromagnetic air valve and the electromagnetic air valve upper cover are provided within the housing.

3. The pump-valve integrated machine for the pneumatic lumbar support of the automobile seat according to claim 1, wherein the pump-valve integrated machine further comprises a pressure sensor, and a mounting hole for the pressure sensor is situated upon a side wall of the electromagnetic air valve lower base; the mounting hole for the pressure sensor communicates with the ventilation hole, and a connection pipe is disposed outside the mounting hole for the pressure sensor, and the connection pipe is connected with the pressure sensor, and is configured to transmit a pressure signal to the pressure sensor; the pressure sensor and the control circuit board are electrically connected.

4. The pump-valve integrated machine for the pneumatic lumbar support of the automobile seat according to claim 1, wherein a mounting groove is situated upon the electromagnetic air valve lower base and around the ventilation hole, and a sealing ring is disposed in the mounting groove that is situated upon the electromagnetic air valve lower base and around the ventilation hole, and is configured to achieve sealing between the electromagnetic air valve lower base and the normally open electromagnetic air valve.

5. The pump-valve integrated machine for the pneumatic lumbar support of the automobile seat according to claim 2, wherein a mounting groove is situated upon the electromagnetic air valve lower base and around the ventilation hole, and a sealing ring is disposed in the mounting groove that is situated upon the electromagnetic air valve lower base and around the ventilation hole, and is configured to achieve sealing between the electromagnetic air valve lower base and the normally open electromagnetic air valve.

6. The pump-valve integrated machine for the pneumatic lumbar support of the automobile seat according to claim 3, wherein a mounting groove is situated upon the electromagnetic air valve lower base and around the ventilation hole, and a sealing ring is disposed in the mounting groove that is situated upon the electromagnetic air valve lower base and around the ventilation hole, and is configured to achieve sealing between the electromagnetic air valve lower base and the normally open electromagnetic air valve.

7. The pump-valve integrated machine for the pneumatic lumbar support of the automobile seat according to claim 1, wherein the normally open electromagnetic air valve comprises an outer frame, a wire rack, a valve core, a rubber plug, and a spring, wherein an axial air inlet groove is situated upon a bottom of the outer frame; the axial air inlet groove corresponds to the ventilation hole of the electromagnetic air valve lower base; the wire rack is disposed on the outer frame, and a varnished wire is wound outside the wire rack; the valve core is sleeved in the wire rack, and upper and lower ends of the valve core are each provided with a groove, and the two grooves are each provided with the rubber plug; the spring is sleeved on an outer side surface of a butting section of the valve core and the outer frame, and the valve core and the wire rack are in clearance fit to form a ventilation passage; an air inlet end of the ventilation passage is communicated with the axial air inlet groove, and when the valve core is under an action of the spring, the rubber plug is disposed directly above the axial air inlet groove, and when the electromagnetic air valve is powered on, the rubber plug is capable of sealing with the axial air inlet groove under an action of an electromagnetic force.

8. The pump-valve integrated machine for the pneumatic lumbar support of the automobile seat according to claim 2, wherein the normally open electromagnetic air valve comprises an outer frame, a wire rack, a valve core, a rubber plug, and a spring, wherein an axial air inlet groove is situated upon a bottom of the outer frame; the axial air inlet groove corresponds to the ventilation hole of the electromagnetic air valve lower base; the wire rack is disposed on the outer frame, and a varnished wire is wound outside the wire rack; the valve core is sleeved in the wire rack, and upper and lower ends of the valve core are each provided with a groove, and the two grooves are each provided with the rubber plug; the spring is sleeved on an outer side surface of a butting section of the valve core and the outer frame, and the valve core and the wire rack are in clearance fit to form a ventilation passage; an air inlet end of the ventilation passage is communicated with the axial air inlet groove, and when the valve core is under an action of the spring, the rubber plug is disposed directly above the axial air inlet groove, and when the electromagnetic air valve is powered on, the rubber plug is capable of sealing with the axial air inlet groove under an action of an electromagnetic force.

9. The pump-valve integrated machine for the pneumatic lumbar support of the automobile seat according to claim 3, wherein the normally open electromagnetic air valve comprises an outer frame, a wire rack, a valve core, a rubber plug, and a spring, wherein an axial air inlet groove is situated upon a bottom of the outer frame; the axial air inlet groove corresponds to the ventilation hole of the electromagnetic air valve lower base; the wire rack is disposed on the outer frame, and a varnished wire is wound outside the wire rack; the valve core is sleeved in the wire rack, and upper and lower ends of the valve core are each provided with a groove, and the two grooves are each provided with the rubber plug; the spring is sleeved on an outer side surface of a butting section of the valve core and the outer frame, and the valve core and the wire rack are in clearance fit to form a ventilation passage; an air inlet end of the ventilation passage is communicated with the axial air inlet groove, and when the valve core is under an action of the spring, the rubber plug is disposed directly above the axial air inlet groove, and when the electromagnetic air valve is powered on, the rubber plug is capable of sealing with the axial air inlet groove under an action of an electromagnetic force.

10. The pump-valve integrated machine for the pneumatic lumbar support of the automobile seat according to claim 9, wherein an air outlet passage is disposed in the electromagnetic air valve upper cover, and an air outlet hole of the air outlet passage is disposed on a side wall of the electromagnetic air valve upper cover, and an air vent hole is situated upon the air outlet passage at a position corresponding to the rubber plug on an upper end of the valve core, an air inlet passage is disposed on a side wall of the air vent hole, and the air inlet passage is communicated with the air vent hole, the air outlet connector and the normally open electromagnetic air valve; in a normal case, a seal forms between the rubber plug on the upper end of the valve core and the air vent hole on the air outlet passage, and an air bag is inflated by the gas from the normally open electromagnetic air valve through the air inlet passage and the air outlet connector; when the electromagnetic air valve is powered on, the air pump stops inflating, and air in the air bag is discharged through the air outlet connector, the air inlet passage, the air vent hole, and the air outlet passage.

11. The pump-valve integrated machine for the pneumatic lumbar support of the automobile seat according to claim 10, wherein a placement groove is situated in the electromagnetic air valve upper cover at a position opposite to the wire rack, and one end of the wire rack is inserted into the placement groove; a mounting groove is situated around the placement groove, and is provided with a sealing ring in the mounting groove that is situated around the placement groove.

12. The pump-valve integrated machine for the pneumatic lumbar support of the automobile seat according to claim 10, wherein a noise-reduction cotton is pasted on the outer side of the air outlet of the air outlet passage.

* * * * *